(12) United States Patent
Franklin et al.

(10) Patent No.: US 7,400,334 B1
(45) Date of Patent: Jul. 15, 2008

(54) USE OF VECTOR GRAPHICS IN PAPER PRINTING AND WEBSITE DEVELOPMENT

(75) Inventors: William B. Franklin, Greensboro, NC (US); Thomas W. Oliver, Thomasville, NC (US)

(73) Assignee: 809, L.L.C., High Point, NC (US)

( * ) Notice: Subject to any disclaimer, the term of this patent is extended or adjusted under 35 U.S.C. 154(b) by 1011 days.

(21) Appl. No.: 09/676,445

(22) Filed: Sep. 29, 2000

(51) Int. Cl.
G09G 5/00 (2006.01)

(52) U.S. Cl. .................. 345/619; 345/629; 358/1.15; 358/1.9

(58) Field of Classification Search ............... 345/763, 345/604, 619, 629; 707/517–525, 513, 104, 707/200; 358/1.9, 1.15; 156/277; 709/102, 709/328
See application file for complete search history.

(56) References Cited

U.S. PATENT DOCUMENTS

| | | | | |
|---|---|---|---|---|
| 5,057,931 A | | 10/1991 | Numakura et al. | 358/298 |
| 5,380,044 A | * | 1/1995 | Aitkens et al. | 156/277 |
| 5,740,425 A | | 4/1998 | Povilus | 395/611 |
| 5,748,860 A | | 5/1998 | Shively | 356/1.15 |
| 5,790,793 A | | 8/1998 | Higley | 395/200.48 |
| 5,870,717 A | * | 2/1999 | Wiecha | 705/26 |
| 5,937,144 A | | 8/1999 | Wilkins et al. | 395/102 |
| 5,956,737 A | * | 9/1999 | King et al. | 707/517 |
| 5,984,446 A | * | 11/1999 | Silverbrook | 347/3 |
| 5,999,915 A | | 12/1999 | Nahan et al. | 705/27 |
| 6,006,231 A | * | 12/1999 | Popa | 709/328 |
| 6,017,157 A | | 1/2000 | Garkinkle et al. | 396/639 |
| 6,055,064 A | | 4/2000 | Lifshitz et al. | 358/1.9 |
| 6,057,854 A | | 5/2000 | Davis, Jr. et al. | 345/433 |
| 6,057,931 A | * | 5/2000 | McConnell et al. | 358/1.9 |
| 6,133,985 A | | 10/2000 | Garfinkle et al. | 355/40 |
| 6,167,382 A | | 12/2000 | Sparks et al. | 705/26 |
| 6,195,664 B1 | * | 2/2001 | Tolfa | 707/200 |
| 6,205,452 B1 | * | 3/2001 | Warmus et al. | 715/500 |
| 6,275,301 B1 | | 8/2001 | Bobrow et al. | 358/1.2 |
| 6,279,043 B1 | * | 8/2001 | Hayward et al. | 709/328 |
| 6,332,149 B1 | | 12/2001 | Warmus et al. | 707/517 |
| 6,344,853 B1 | * | 2/2002 | Knight | 345/629 |
| 6,429,947 B1 | * | 8/2002 | Laverty et al. | 358/1.15 |
| 6,430,591 B1 | * | 8/2002 | Goddard | 709/102 |
| 6,483,524 B1 | * | 11/2002 | Petchenkine et al. | 345/763 |
| 6,519,050 B1 | | 2/2003 | Eintracht et al. | 358/1.15 |
| 6,552,732 B1 | * | 4/2003 | Davis et al. | 345/619 |
| 6,611,348 B1 | * | 8/2003 | Chase et al. | 358/1.15 |

(Continued)

OTHER PUBLICATIONS

Webopedia information on graphic file formats from the internet; Jul. 26, 2000.

(Continued)

*Primary Examiner*—Jin-Cheng Wang
(74) *Attorney, Agent, or Firm*—MacCord Mason PLLC

(57) ABSTRACT

A method of creating a web page from a vector graphics data file includes converting the vector graphics data file from its native file format to a bit map graphics file format, modifying the bit map graphics data file by converting color values to a format that can be displayed on a computer monitor, and inserting the modified bit map graphics data file into the web page substantially identical to the catalog printed on paper; and making the electronic catalog available for viewing using a browser.

31 Claims, 2 Drawing Sheets

U.S. PATENT DOCUMENTS

| | | | |
|---|---|---|---|
| 6,611,349 B1 * | 8/2003 | Vogt et al. | 358/1.15 |
| 6,611,725 B1 | 8/2003 | Harrison et al. | 700/98 |
| 2001/0032134 A1 | 10/2001 | Hardesty | 705/14 |
| 2002/0002513 A1 | 1/2002 | Chiasson | 705/27 |
| 2002/0184116 A1 | 12/2002 | Tam et al. | 705/27 |

OTHER PUBLICATIONS

Webopedia information on graphics from the internet; Jul. 26, 2000.
Webopedia information on paint program from the internet; Jul. 26, 2000.
Webopedia information on Adobe PhotoShop from the internet; Jul. 26, 2000.
Webopedia information on vector graphics from the internet; Jul. 26, 2000.
Webopedia information on export from the internet; Jul. 26, 2000.
Webopedia information on PostScript from the internet; Jul. 26, 2000.
Webopedia information on EPS from the internet; Jul. 26, 2000.
Webopedia information on native from the internet; Jul. 26, 2000.
Webopedia bit map information from the Internet; copyright 1999-2000, possible prior art.
Webopedia JPEG information from the Internet; copyright 1999-2000, possible prior art.
Webopedia import information from the internet, undated, possible prior art.
Webopedia service bureau information from the internet, undated, possible prior art.
Splash page information from the internet; copyright 1996-2000.
Adobe Page Mill information from the internet; copyright 2000.
What's?com information from the internet; copyright 2000-2003.
Webopedia raster image processor information from the internet; copyright 2003.
Webopedia bit-mapped graphics information from the internet; undated, possible prior art.

* cited by examiner

USE OF VECTOR GRAPHICS IN PAPER PRINTING AND WEBSITE DEVELOPMENT

BACKGROUND OF THE INVENTION

The present invention relates to conversion of vector graphics files to files suitable for display on a computer, such as a computer running an Internet browser.

In the furniture industry, furniture manufacturers have for years generated very carefully planned and designed catalogs to aid in the promotion and sale of their products. Catalog design has become quite sophisticated, with particularized placement of text and graphics on the pages being chosen by the catalog designers to achieve specialized visual effects. Among the effects desired are the overlay of one photograph over a part of another.

With the advent of the Internet and e-commerce endeavors, it is desired to replicate such catalogs on the Internet so that viewers and potential customers on the Internet will have identically the same image available to them as would be available in the printed catalog.

Similarly, it may be desirable for many other types of print media to be transported to a browser-display with fidelity to the original.

The state-of-the-art in printing, particularly with respect to catalogs, but for other printed products also, involves the use of digital electronics. The image to be printed is stored in an electronic file in a vector graphics format. In vector graphics, mathematical equations and file pointers are used to collate the text and images to be printed on the printed page. These files can then be used to make the separations used in the printing process according to known techniques.

The size of the digital files for such printed pages, even using vector graphics, can be on the order of 25 million bytes, too large for transmission at reasonable speeds over commonly available digital networks. Also, among the 25 million bytes of information is much more detail than can typically be displayed on a monitor used in an Internet or other browser system. Typically, browsers display information in much less resolution, such as in the jpeg or gif format, having more on the order of 25,000 bytes of information, which can be reasonably quickly transmitted over digital networks.

Similarly, the browsers display images according to instructions imbedded in a markup language, typically html. In html, code is written to determine the color, size, and placement of various items on a page, and such code is typically written or edited in a manual mode, although some page editor programs are now available. Nonetheless, creation of an html page or other markup language page to replicate with high fidelity the images of a printed catalog or other printed publication is very difficult and time consuming. Essentially, the html page must be prepared from scratch, requiring trial and error to determine how well the browser-displayed page replicates the printed page. Errors must be corrected by rewriting code.

Accordingly, there is a need in the art for a system that will expedite the conversion of printed page digital files to those which can be displayed in html or other markup language format on browsers.

Also, there is a need in the art for an economical way to replicate printed catalog pages and other printed pages in a browser display with high fidelity.

SUMMARY OF THE INVENTION

The present invention fulfills this need in the art by providing a method of creating a web page from a vector graphics data file including converting the vector graphics data file from its native file format to a bit map graphics file format, modifying the bitmap graphics data file by converting color values to a format that can be displayed on a computer monitor, and inserting the modified bit map graphics data file into the web page. Typically, compression of the modified bitmap graphics data file takes place prior to inserting. Further, compressing may precede modifying. Alternatively, modifying may precede converting. The vector graphics data file need not be used to print on paper to be within the scope of the invention.

Desirably, the bit map graphics file is compressed by reducing the resolution of an image encoded in the file to less than 100 dots per inch (dpi). Preferably, the bit map graphics file is compressed by reducing the resolution of an image encoded in the file to about 72 dpi.

In one embodiment, the bit map graphics file is compressed by converting the bit map graphics file to a joint photographic experts (jpeg) file. This may occur by opening the bit map graphics file in a paint program and exporting the bit map graphics file to a jpeg file format.

In another embodiment, the bit mapped graphics file is compressed by converting the bit mapped graphics file to a graphics interchange format (gif) file. Alternatively, the bit mapped graphics file may be compressed by converting the bit mapped graphics file to a tagged image file (tif) format file or an X bitmap (xbm) file.

Typically, the compressed and modified bit map graphics data file is inserted into the web page by tagging the file as an inline image. The inline image may be a link to a higher resolution version of an image that is substantially the same as the inline image. Typically, the compressed and modified bit map graphics data file is inserted into the web page by tagging the file as an external image.

In a preferred embodiment the vector graphics data file is a prepress data file. The prepress data file may be created using a software application program selected from the group consisting of QuarkXPress, Adobe Illustrator, Macromedia Freehand, Adobe PageMaker, Corel Draw and Adobe Acrobat.

The web page is usually a markup language file. The markup language may be one selected from the group consisting of hypertext markup language (html), extensible markup language (xml), Cold Fusion markup language (cfml), commerce xml (cxml), handheld device markup language (hdml), standard generalized markup language (sgml), synchronized multimedia integration language (smil), extensible hypertext markup language (xhtml), extensible style langue (xsl), and wireless markup language (wml).

The bit map graphics file is preferably an encapsulated postscript (eps) file. In one embodiment when the eps file is rendered, it makes an 8.5" by 11" image.

In a preferred embodiment, the vector graphics data file is a prepress data file, the bit map graphics file is an encapsulated post script (eps) file, and the prepress data file is converted to an eps file by exporting the prepress data file in its native file format to an eps format. In another embodiment, the vector graphics data file is a prepress data file, the bit map graphics file is in a tagged image file format (tif), and the prepress data file is converted to a tif file by exporting the prepress data file in its native file format to an tif format. In a preferred embodiment, the prepress data file is used to print paper copies, but that is not required to be within the scope of the invention.

Typically, the bit map graphics file is modified by converting the cyan, magenta, yellow, black (CMYK) color values to red, green, blue (RGB) color values. The CMYK color values may be converted to RGB color values by a paint program.

The markup language may be selected from the group consisting of hypertext markup language (html), extensible markup language (xml), Cold Fusion markup language (cfml), commerce xml (cxml), handheld device markup language (hdml), standard generalized markup language (sgml), synchronized multimedia integration language (smil), extensible hypertext markup language (xhtml), extensible style langue (xsl), and wireless markup language (wml).

The invention also provides a method of creating a web page from a composite file made up of a vector graphics data file and an image file including converting the vector graphics data file from its native file format to a bit map graphics file format, modifying the bitmap graphics data file by converting color values to a format that can be displayed on a computer monitor, and inserting the modified bit map graphics data file into the web page.

The invention also provides a method of displaying a plurality of products on a website in connection the offering for sale of the plurality of products including creating a vector graphics data file, wherein the vector graphics data file includes data capable of being converted to a press plate to create a catalog printed on paper, deriving from the vector graphics data file an electronic catalog, wherein the electronic catalog appears to be substantially identical to the catalog printed on paper, and making the electronic catalog available for viewing using a browser.

Further, the invention provides a method of displaying a plurality of products on a website in connection the offering for sale of the plurality of products including creating a composite file comprised of a vector graphics data file and an image file, wherein the composite file is capable of being converted to a press plate for a catalog printed on paper, deriving from the composite file an electronic catalog, wherein the electronic catalog appears to be substantially identical to the catalog printed on paper, and making the electronic catalog available for viewing using a browser.

The invention also includes a method for creating a web page from a vector graphics data file, including converting the vector graphics data file from its native file format to a bit map graphics file format including both text and images, modifying the bitmap graphics data file by converting color values to a format that can be displayed on a computer monitor, correcting errors in the text that occur when the vector graphics data file was converted from its native file format to a bit map graphics file format, and inserting the modified bit map graphics data file into the web page.

The invention also provides a method of communicating including displaying on a web browser a web page. The web page was made by creating the web page from a vector graphics data file, including the steps outlined above.

The invention also provides an article of manufacture including a terminal connected to a network and including a video display terminal. The video display terminal displays a displayed web page made by creating the web page from a vector graphics data file, as outlined above.

BRIEF DESCRIPTION OF THE DRAWINGS

The invention will be better understood by a reading of the Detailed Description of the Preferred Embodiments along with a review of the drawings, in which.

DETAILED DESCRIPTION OF THE PREFERRED EMBODIMENT

Figure 1:
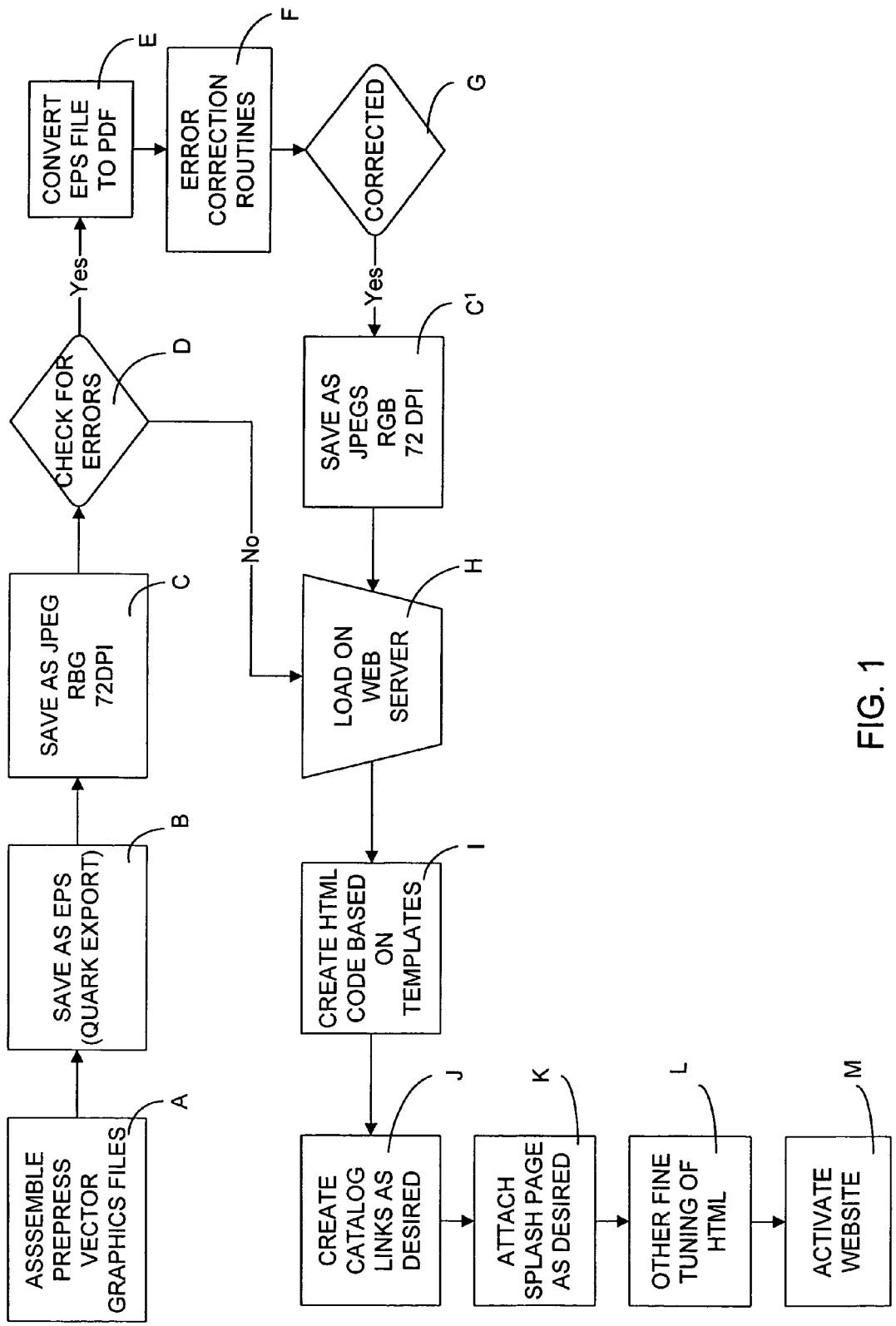
FIG. 1 is a high level flow chart of a process according to a preferred embodiment of the invention.

FIG. 1 shows a flow chart of the steps involved in connection with a preferred embodiment of the invention. First, the vector graphics data files are assembled to be available for use in a step A. Vector graphics, also known as object-oriented graphics, refers to software and hardware that use geometrical formulas to represent images. Vector graphics are created and manipulated in software called "draw" programs. The vector graphics data files will be composites of text, fonts, and graphics, with the vector graphics directing their assembly in a desired layout and appearance.

In a preferred embodiment, the vector graphics files are created using a draw program, such as the QuarkXpress computer software program available from Quark, Inc. of Denver, Colo. Such programs are commonly used in the prepress industry. Other comparable programs can be used, such as Adobe Illustrator, Macromedia Freehand, Adobe PageMaker, Corel Draw, and Adobe Acrobat. The process will be described with reference to QuarkXpress. In a preferred embodiment, the files should be established or modified so that "scale" is 100%, and "bleed" is set at 0. The "format" should be Color, with a PICT Preview. The "data" should be Binary, with OPI to Include Images. "Spread" should be left unchecked, unless it is a spread page, in which case it must be checked. Each page should be saved as an 8½×11 eps format if it is desired to simulate that orientation. Alternatively, if a spread is desired, made up of two side-by-side 8½×11 pages, then the file should be saved as 17×11 format.

By exporting from the draw program, the files can be saved as eps files in step B. "Eps" stands for "encapsulated postscript," a file format used by Adobe programs. The export of the prepress data file is typically an export from the native file format to an eps format.

In step C, the eps file is opened in Adobe Photoshop and converted to a jpeg file and simultaneously converted from CMYK color space to RGB for use in website displays. That is, bit map graphics file is converted to a jpeg file by opening the bit map graphics file in a paint program and exporting the bit map graphics file to a jpeg file format. A paint program is a graphics program that displays pictures on the display screen which are represented as bit-maps. Adobe Photoshop has built-in capabilities to perform these transformations. Other paint programs can be used.

Other browser-friendly file formats can be substituted for jpeg, such as a graphics interchange format (gif) file. Alternatively, the bit mapped graphics file may be compressed by converting the bit mapped graphics file to a tagged image file (tif) format file or an X bitmap (xbm) file.

CMYK stands for cyan, magenta, yellow and black, which are the ink colors typically used in ink printing. RGB stands for red, green, blue, the colors that are typically combined to form a range of colors on video monitors. The resolution is stepped down from the high resolution of the eps and vector graphics files to one on the order of 72 dots per inch (dpi). This greatly reduces the file size, enabling faster transmission over networks like the Internet and reduces storage requirements. Other resolutions can be used, such as 100 dpi or less. The compression and color-space conversion may take place simultaneously. Alternatively, one can precede the other.

The jpeg files are displayed on a computer monitor in step D, where they can be compared with computer monitor displays of the vector graphics file or a printed catalog or other printed material derived from the vector graphics files. If errors are detected, they can be corrected using various error correction routines in steps E, F, and G. These error correction routines will be discussed in more detail hereinafter. If these are successful as detected in a further error evaluation step G, the file is saved as a jpeg in step C', like previous step C.

If the initial check for errors in block D indicates that no errors are present, then processing continues directly to block H. This saved jpeg file can then be loaded on a web server in step H.

Often, prepress work is performed on Apple MacIntosh computers, and web servers commonly are personal computers. In a situation of this sort, it is desirable to transfer files from the MacIntosh to the PC using conventional file saving and transfer techniques, as will be apparent to those of ordinary skill in the art.

In order to create the html code, a commercially available program called PageMill is opened on the web server. Other suitable editor programs for html or other markup languages can be substituted.

Working on the web server, a pre-existing markup language code template may be selected from a collection of pre-existing templates. The template approximates the page layout of the desired catalog. Alternatively, if there are no pre-existing templates, a new one can be created. These templates typically are simple and do not include a particularized layout of text and graphics on the page. Rather, they include an indication as to whether the site may have a table of contents, links to other pages within the website, or links to enlarged versions of images on the website page. As such, they are simple to create and edit. More complex files can be used if desired.

Various browser-usable codes such as hypertext markup language (html), extensible markup language (xml), Cold Fusion markup language (cfml), commerce markup language xml (cxml), handheld device markup language (hdml), standard generalized markup language (sgml), synchronized multimedia integration language (smil), extensible hypertext markup language (xhtml), extensible style language (xsl), and wireless markup language (wml) may be used as the markup language.

The process then moves to step J. This involves creating the catalog html's with images in place and tabs created, using the markup language editor. That is, the jpeg images are keyed to frames in the templates, where they are desired to be located. Frames may be linked and cross linked as desired. No lengthy code writing is needed. Rather, the compressed and modified bit map graphics data file is inserted into the web page by tagging the file as an inline image. The inline image may be a link to a higher resolution version of an image that is substantially the same as the inline image.

A compressed and modified bit map graphics file is preferably inserted into the web page by tagging the file as an inline image. The inline image may be a link to a higher resolution version of an image that is substantially the same as the inline image, except usually larger in viewed size. Also, the compressed and modified bit map graphics data file may be inserted into the web page by tagging the file as an external image.

Once the general format has been selected, catalog links can be established, whether to other websites or elsewhere back and forth within the catalog or other website document being created.

If a splash page is desired, it can be attached as a lead-in page at step K. This can be done by opening an existing splash page and modifying the opened file and saving it as the splash page for the new website. If no existing splash page exists, it is simple html code writing to establish one.

Step L establishes a homepage for the catalog. This involves opening an existing online html, creating and resaving as the new online html, and linking the online html to the catalog html. Then, the existing online entry page is opened and created and saved as a new entry page, and linked to the online html.

Thereupon, in step M, the website can be activated. Once the entry html is loaded on a web server, the web server is or rebooted to activate all of the links in the html website. Preferably, the newly created website is checked using various types of browsers and browser configurations to ascertain that the pages display as desired. For example, the page can be viewed on an Apple MacIntosh® computer or a personal computer PC while using web browsers such as Netscape® Navigator®, and Microsoft® Internet Explorer.

Error Correction

The error correction routines of step F will now be discussed. Typical errors arise from and are exhibited as poor displays of text material. The errors can be distortions in fonts, shaping, or sizes. Another error that sometimes may occur and require correction is that gradual color changes are not gradual in the browser display, but rather stair-step in gradation, called a graduated screen. Depending on the nature of the prepress files being used, various error correction routines can be used. For example, if the prepress has been a QuarkXpress file, then the error correction routine E may be as follows:

close the opened eps file, restart Quark, and resave the files in eps.

If the errors continue to persist, then close the file again and open the files in an alternate version of Photoshop.

If the errors continue to exist, revert back to the Quark files and save the Quark files as postscript files, not eps files. Open them again in Photoshop to see if the errors persist. If the errors continue, convert the postscript file to pdf using Acrobat Distiller®. Then, open the pdf file in Photoshop and compare to the printed sample or document. If the error continues, save the Quark page as a pdf file using Acrobat pdf writer. Again, open the pdf file in Photoshop and compare with the printed sample.

If the error continues, try using the procedures on a different computer, particularly a different MacIntosh. This series of iterative steps should correct most errors. If errors persist, then the error may not be correctable.

If the prepress file is an Adobe Illustrator file, then the error correction routine E can take the form of exporting the file from Quark as a tif file and comparing it to the printed or displayed image to see if that works. If that does not work, then the Quark file can be exported as a PS5 file to ascertain if that works. If not, it can be exported as an Illustrator eps file and checked to see if the error is corrected. In each case, the exported file is to be opened in Photoshop and compared to the printed or displayed sample or document to check to see if the error has been corrected.

In the case of Adobe PageMaker as the prepress file, the Adobe PageMaker program can export the file as a pdf file. That pdf file is then opened in Photoshop and compared to a printed sample or document to ascertain if it is acceptable. That should correct most errors, but if not, the error may not be correctable.

In the case of the prepress program being Macromedia Freehand®, the files can be exported in any one of five formats, preferably in the following order, and then opened in Photoshop and compared to see if the format is correct. First, export as a PS eps. Second, export as a generic eps. Third, export as a tif. Fourth, export as a DCS2. Fifth, export as a Quark eps. Sixth, save as an editable eps. The exported file can be opened in Photoshop and compared to the printed sample or document and should be corrected by one or the other of these alternate methods. In the event that it is not corrected, it may not be correctable.

Benefits and Uses

The resulting page on the website or other browser display will be of a relatively small size in comparison with prepress files, so that it will be transmittable in a reasonable amount of time. However, the image as displayed will be virtually indistinguishable from the printed page which has been copied. The only differences may be some possibly apparent loss of resolution or color deviations arising from errors in conversion from CMYK to RGB. However, such derivations are quite acceptable, and deemed to be minimal enough so that the browser image is substantially identical to the printed image obtained from the vector graphics file.

Preferably, in the outputting of the file as a jpeg or gif, the file is compressed considerably so that the transmission time is at a commercially acceptable level over digital networks. For example, the file can be compressed by reducing the resolution of an image encoded in the file to less than 100 dots/inch, preferably to about 72 dots/inch. The type of files in which the bit map graphics file is converted to a jpeg file can generically be referred to as a paint program, and suitable paint programs may be used. In addition to the jpeg and gif files, the compressed file can be a tagged image file or an X bit map file.

As will be appreciated, by converting the vector graphics file as a whole to a displayable jpeg or other bit-mapped file format, the layout achieved in the vector graphics file is exactly reproduced in the displayed bit-mapped file. This image is available for ready display via the markup language code to which it has been attached. Thus, the same layout is available in the browser display as in any printed product of the vector graphics display, without the need for writing markup language code to selectively place images and text, which could be a very time consuming and tedious task.

Also, because the file size has been reduced in the process, transmission times for the files are relatively short.

By the use of the file conversion steps set forth above, a method of doing business is created and enabled. That method of doing business involves the use of paper and browser accessible catalogs, which are substantially identical, with the browser-accessible catalog being readily accessible in reasonable amounts of time over digital networks, such as the Worldwide Web. This enables a provider of goods and services in the catalog to reach customers through either medium, or both mediums, with consistent messages.

Figure 2:
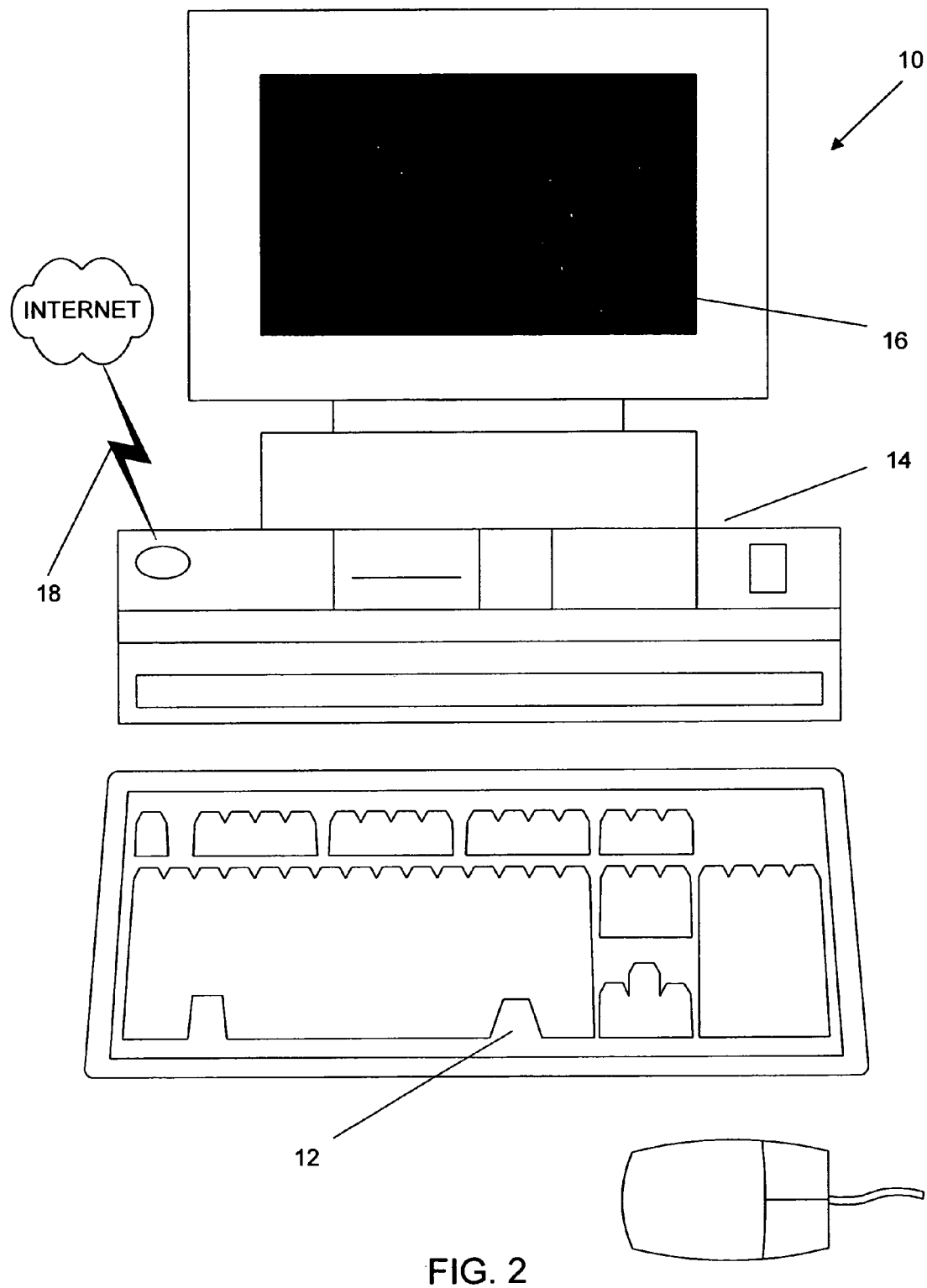
FIG. 2 is a schematic view of a computer terminal connected to a network to display a web page.

FIG. 2 shows a computer arrangement 10 including keyboard 12, central processing unit 14, monitor 16, and network connection 18. When connected to a network making available pages created as outlined above, the result can be the display of pages on the monitor substantially identical to pages that may have been printed from the vector graphics files.

What is claimed is:

1. A method of creating an electronic catalog web page and a catalog printed on paper from a vector graphics data file comprising
    printing the catalog on paper from the vector graphics data file;
    converting the vector graphics data file from its native file format to a bit map graphics file format;
    modifying the bitmap graphics data file by converting cyan, magenta, yellow, black (CMYK) color values to red, green, blue (RGB) color values;
    inserting the modified bit map graphics data file into the electronic catalog web page; and
    making the electronic catalog web page available on the Internet for members of the public to view on a computer monitor after the catalog has been printed on paper from the vector graphics data file.

2. The method of claim 1, wherein the method is further comprised of compressing the modified bitmap graphics data file prior to inserting.

3. The method of claim 2, wherein compressing precedes modifying.

4. The method of claim 2, wherein the bit map graphics file is compressed by reducing the resolution of an image encoded in the file to less than 100 dots per inch (dpi).

5. The method of claim 4, wherein the bit map graphics file is compressed by reducing the resolution of an image encoded in the file to about 72 dpi.

6. The method of claim 2, wherein the bit map graphics file is compressed by converting the bit map graphics file to a joint photographic experts jpeg) file.

7. The method of claim 6, wherein the bit map graphics file is converted to a jpeg file by opening the bit map graphics file in a paint program and exporting the bit map graphics file to a jpeg file format.

8. The method of claim 2, wherein the bit mapped graphics file is compressed by converting the bit mapped graphics file to a graphics interchange format (gif) file.

9. The method of claim 2, wherein the bit mapped graphics file is compressed by converting the bit mapped graphics file to a tagged image file (tif) format file.

10. The method of claim 2, wherein the bit mapped graphics file is compressed by converting the bit mapped graphics file to an X bitmap (xbm) file.

11. The method of claim 2, wherein the compressed and modified bit map graphics data file is inserted into the web page by tagging the file as an inline image.

12. The method of claim 11, wherein the inline image is a link to a higher resolution version of an image that is substantially the same as the inline image.

13. The method of claim 2, wherein the compressed and modified bit map graphics data file is inserted into the web page by tagging the file as an external image.

14. The method of claim 1, wherein modifying precedes converting.

15. The method of claim 1, wherein the vector graphics data file is a prepress data file.

16. The method of claim 15, wherein the prepress datafile is created using a software application program selected from the group consisting of QuarkXPress, Adobe Illustrator, Macromedia Freehand, Adobe PageMaker, Corel Draw and Adobe Acrobat.

17. The method of claim 1, wherein the web page is a markup language file.

18. The method of claim 17, wherein the markup language is selected from the group consisting of hypertext markup language (html), extensible markup language (xml), Cold Fusion markup language (cfml), commerce markup language xml (cxml), handheld device markup language (hdml), standard generalized markup language (sgml), synchronized multimedia integration language (smil), extensible hypertext markup language (xhtml), extensible style language (xsl), and wireless markup language (wml).

19. The method of claim 1, wherein the bit map graphics file is an encapsulated post script (eps) file.

20. The method of claim 19, wherein the eps file, when rendered, is an 8.5" by 11" image.

21. The method of claim 1, wherein the vector graphics data file is a prepress data file, the bit map graphics file is an encapsulated post script (eps) file, and the prepress data file is converted to an eps file by exporting the prepress data file in its native file format to an eps format.

22. The method of claim 1, wherein the vector graphics data file is a prepress data file, the bit map graphics file is in a tagged image file format (tif), and the prepress data file is converted to a tif file by exporting the prepress data file in its native file format to an tif format.

23. The method of claim 1, wherein the CMYK color values are converted to RGB color values using a paint program.

24. A method of creating an electronic catalog web page and a catalog printed on paper from a vector graphics data file comprising
 printing the catalog on paper from the vector graphics data file;
 converting the vector graphics data file from its native file format to a bit map graphics file format;
 compressing the bitmap graphics file by reducing the resolution of an image encoded in the file to less than 100 dots per inch (dpi) by converting cyan, magenta, yellow, black (CMYK) color values to red, green, blue (RGB) color values;
 modifying the bit-mapped graphics file;
 inserting the modified bit map graphics data file into the electronic catalog web page; and
 making the electronic catalog web page available on the Internet for the public to view on a computer monitor after the catalog has been printed on paper from the vector graphics data file.

25. A method of creating an electronic catalog web page and a catalog printed on paper from a composite file comprised of vector graphics data file and an image file, the method comprising printing the catalog on paper from the vector graphics data file;
 converting the vector graphics data file from its native file format to a bit map graphics file format;
 modifying the bitmap graphics data file by converting cyan, magenta, yellow, black (CMYK) color values to red, green, blue (RGB) color values;
 inserting the modified bit map graphics data file into a web page template;
 generating the electronic catalog web page from the web page template; and
 making the electronic catalog web page available on the Internet for the public to view on a computer monitor after the catalog has been printed on paper from the vector graphics data file.

26. A method for creating a plurality of electronic catalog web pages and a catalog printed on paper from a vector graphics data file, wherein the plurality of web pages is substantially identical to a printed catalog publication rendered from the vector graphics data file comprising
 printing the catalog on paper from the vector graphics data file;
 converting each of a plurality of pages of a printed publication rendered from the vector graphics data file from its native file format to a bit map graphics file format;
 modifying each of the plurality of the bitmap graphics data file by converting cyan, magenta, yellow, black (CMYK) color values to red, green, blue (RGB) color values;
 inserting each of the plurality of the modified bit map graphics data file into an electronic catalog web page; and
 linking the plurality of electronic catalog web pages such that the plurality of electronic catalog web pages are available on the Internet for the public to view on a computer monitor after the catalog has been printed on paper from the vector graphics data file.

27. A method of displaying a plurality of products on a website in connection with the offering for sale of the plurality of products, the method comprising
 creating a vector graphics data file, wherein the vector graphics data file includes data capable of being converted to a press plate to create a catalog printed on paper;
 printing the catalog on paper from the vector graphics data file;
 deriving from the vector graphics data file an electronic catalog, wherein the electronic catalog appears to be substantially identical to the catalog printed on paper; and
 making the electronic catalog available for general viewing on browsers on computer monitors after the catalog has been printed on paper from the vector graphics data file.

28. A method of displaying a plurality of products on a website in connection with the offering for sale of the plurality of products, the method comprising the following steps in the sequence set forth:
 creating a composite file comprised of a vector graphics data file and an image file, wherein the composite file is capable of being converted to a press plate for a catalog printed on paper;
 printing the catalog on paper from the vector graphics data file;
 deriving from the composite file an electronic catalog, wherein the electronic catalog appears to be substantially identical to the catalog printed on paper; and
 making the electronic catalog available for general viewing on browsers on computer monitors after the catalog has been printed on paper from the vector graphics data file.

29. A method of creating an electronic catalog web page and a catalog printed on paper from a vector graphics data file comprising
 printing the catalog on paper from the vector graphics data file;
 converting the vector graphics data file from its native file format to a bit map graphics file format including both text and images;
 modifying the bitmap graphics data file by converting cyan, magenta, yellow, black (CMYK) color values to red, green, blue (RGB) color values;
 correcting text errors through the use of error correction routines to correct errors in the text that occur when the vector graphics data file was converted from its native file format to a bit map graphics file format; and
 inserting the modified bit map graphics data file into a web page; and
 making the electronic catalog web page available on the Internet for the public to view on a computer monitor after printing the catalog on paper from the vector graphics data file.

30. A method of displaying communication comprising:
 printing a catalog on paper from a vector graphics data file;
 displaying on a web browser an electronic catalog web page made by creating the web page from a vector graphics data file, including the following steps in the sequence set forth:

converting the vector graphics data file from its native file format to a bit map graphics file format including both text and images;

modifying the bitmap graphics data file by converting cyan, magenta, yellow, black (CMYK) color values to red, green, blue (RGB) color values;

inserting the modified bit map graphics data file into a web page; and making the electronic catalog web page available on the Internet for the public to view on a computer monitor after printing the catalog on paper from the vector graphics data file.

31. A method of creating a web page and a page printed on paper from a vector graphics data file comprising printing the page on paper from the vector graphics data file;

converting the vector graphics data file from its native file format to a bit map graphics file format;

modifying the bitmap graphics data file by converting cyan, magenta, yellow, black (CMYK) color values to red, green, blue (RGB) color values;

correcting text errors through the use of error correction routines to correct the text errors that occur when the vector graphics data file was converted from its native file format to a bit map graphics file format, said error correction routines comprising of:

a) opening said modified bitmap graphics data file with a first drawing program running on a first computer;

b) examining said modified bitmap graphics data file for text errors by visually comparing the raster image of said modified bitmap graphics data file to replicated printed material derived from said vector graphics file;

c) closing and reopening said bitmap graphics data file with a different drawing program and/or different computer if text errors are found in step (b);

d) repeating steps (b) and (c) until no errors are present in said modified bit map graphics file;

e) inserting the modified bit map graphics data file into the web page; and f) making the web page available on the Internet for members of the public to view after printing the catalog on paper from the vector graphics data file.

* * * * *